(12) United States Patent
Mori et al.

(10) Patent No.: US 6,936,560 B2
(45) Date of Patent: Aug. 30, 2005

(54) ZEOLITE LAMINATED COMPOSITE AND ZEOLITE MEMBRANE REACTOR USING THE SAME

(75) Inventors: Nobuhiko Mori, Nagoya (JP); Toshihiro Tomita, Nagoya (JP); Hitoshi Sakai, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 10/792,500

(22) Filed: Mar. 3, 2004

(65) Prior Publication Data

US 2004/0167011 A1 Aug. 26, 2004

Related U.S. Application Data

(63) Continuation of application No. PCT/JP02/09318, filed on Sep. 12, 2002.

(30) Foreign Application Priority Data

Sep. 19, 2001 (JP) ........................................ 2001-285740

(51) Int. Cl.⁷ ................................................ B01J 29/06
(52) U.S. Cl. ............................... 502/4; 502/60; 502/64; 502/71; 502/77
(58) Field of Search .............................. 502/4, 60, 64, 502/71, 77

(56) References Cited

U.S. PATENT DOCUMENTS

| | | | |
|---|---|---|---|
| 4,699,892 A | | 10/1987 | Suzuki |
| 5,554,286 A | | 9/1996 | Okamoto et al. |
| 6,037,292 A | * | 3/2000 | Lai et al. ...................... 502/60 |
| 6,197,427 B1 | | 3/2001 | Anstett et al. |
| 6,667,265 B1 | * | 12/2003 | Tomita et al. .................. 502/4 |
| 6,734,129 B2 | * | 5/2004 | Lai et al. ....................... 502/4 |
| 2001/0012505 A1 | | 8/2001 | Matsukata |

FOREIGN PATENT DOCUMENTS

| | | |
|---|---|---|
| EP | 1 123 898 A1 | 8/2001 |
| JP | 06-321527 A1 | 11/1994 |
| JP | 10-036113 A1 | 2/1998 |
| JP | 10-057784 A1 | 3/1998 |
| JP | 10-152319 A1 | 6/1998 |
| JP | 2000-515849 | 11/2000 |
| WO | WO 99/43424 | 9/1999 |

OTHER PUBLICATIONS

U.S. Appl. No. 10/797,833, filed Mar. 10, 2004, Mori et al.
Chemical Engineering (1997), Oct., 1997, by Naotugu Itou, pp. 761–767.
Kagaku Kogakukai, E107 66th Annual Meeting, no date.

* cited by examiner

*Primary Examiner*—Christina Johnson
(74) *Attorney, Agent, or Firm*—Burr & Brown

(57) ABSTRACT

A zeolite laminated composite of the present invention is characterized in that it has a separation membrane being constituted by a zeolite, and a porous substrate being constituted by a zeolite and having a catalyst function, and that the separation membrane is formed on the porous substrate. The composite shows a small pressure loss and hardly generates defects such as cracks in the separation membrane even under a high temperature condition.

4 Claims, 1 Drawing Sheet

ZEOLITE LAMINATED COMPOSITE AND ZEOLITE MEMBRANE REACTOR USING THE SAME

CROSS REFERENCE TO RELATED APPLICATIONS

This application is a continuation of International Application No. PCT/JP02/09318 having an international filing date of Sep. 12, 2002, which designated the United States, the entirety of which is incorporated herein by reference.

This application also claims the benefit of Japanese Application No. 2001-285740, filed Sep. 19, 2001, the entirety of which is incorporated herein by reference.

TECHNICAL FIELD

The present invention relates to a zeolite laminated composite and a zeolite membrane reactor using the zeolite laminated composite.

BACKGROUND ART

Zeolite composite membranes obtained by forming a zeolite membrane as a separation membrane on a substrate have been known and have been used as a gas separation membrane or a liquid separation membrane.

Zeolite composite membranes and zeolite laminated composites can also be used as a reaction and separation unit possessing a reaction function and a separation function, by being combined with a certain kind of catalyst or the like. For instance, there is a reaction apparatus (which is called a "membrane reactor") wherein the above-mentioned reaction and separation unit is provided inside a reactor; and an example thereof is introduced in, for example, Naoji Ito, Chemical Engineering (1997), October.

The membrane reactor having such a constitution can remove, in a reversible reaction system, a produced substance selectively out of the reaction system and, therefore, has an advantage of allowing the reaction to proceed apparently at a conversion exceeding the equilibrium conversion. As a reaction and separation process using the membrane reactor, a xylene isomerization process is disclosed in Japanese Patent Application Kohyo No. 2000-515849.

Incidentally, as an example of the reaction and separation unit, there is known a type in which a catalyst is filled in the vicinity of a porous substrate and/or a separation membrane composed of a zeolite.

Also in E107 of the 66th annual meeting of Kagaku kogakukai, there is disclosed a reaction and separation unit of a type in which a silicalite (a kind of zeolite) is formed on a porous alumina substrate [in this formation, a low-silica MFI type zeolite membrane (hereinafter referred to also as an "MFI membrane") is formed at the interface between the silicalite and the alumina substrate] and the MFI membrane is utilized as a catalyst.

However, in the above-mentioned reaction and separation unit of a type in which a catalyst is filled in the vicinity of a porous substrate and/or a separation membrane composed of a zeolite, there adds, to the pressure losses of the porous substrate and the separation membrane, a pressure loss of the catalyst-filled layer formed by catalyst filling; therefore, there is a problem that the permeation efficiency of the substance produced by the catalytic reaction of the raw material substance is not good.

Also, in production of the reaction and separation unit of a type disclosed in E107 of the 66th annual meeting of Kagaku kogakukai, there is a problem that it is difficult to control the amount of catalyst and the $SiO_2/Al_2O_3$ (molar ratio) (hereinafter, when simply "$SiO_2/Al_2O_3$" is mentioned, it means a molar ratio) of the MFI membrane formed.

Further, when the MFI membrane has been formed on the alumina substrate, there may be a case that defects such as cracks in the MFI membrane may generate under, for example, a high temperature condition, owing to the difference in thermal expansion behavior between the alumina and the MFI membrane, i.e. the zeolite.

The present invention has been made in view of the above-mentioned problems of the prior art, and aims at a zeolite laminated composite which shows a small pressure loss and hardly generates defects such as cracks in the separation membrane even under a high temperature condition, as well as a zeolite membrane reactor of high separation characteristic and high permeability, using the zeolite laminated composite.

DISCLOSURE OF THE INVENTION

According to the present invention, there is provided a zeolite laminated composite, characterized in that it comprises a separation membrane being constituted by a zeolite, and a porous substrate being constituted by a zeolite and having a catalyst function, and that the separation membrane is formed on the porous substrate.

In the present invention, it is preferred that the crystalline phase of the zeolite constituting the separation membrane and the crystalline phase of the zeolite constituting the porous substrate are the same. It is also preferred that the zeolite constituting the porous substrate has a $SiO_2/Al_2O_3$ (molar ratio) of below 200.

In the present invention, it is also preferred that the crystalline phase of each zeolite is one of an MFI type, an MOR type, an FER type and a BEA type.

According to the present invention, there is also provided a zeolite membrane reactor, characterized in that an interior of a reactor vessel is separated by a zeolite laminated composite, into a raw material substance side contacting with a porous substrate having a catalyst function, of the composite and a produced substance side contacting with a separation membrane of the composite, and that a produced substance formed by the catalytic reaction of a raw material substance is permeated through the separation membrane from the raw material substance side to the produced substance side and is separated.

BEST MODE FOR CARRYING OUT THE INVENTION

Figure 1:
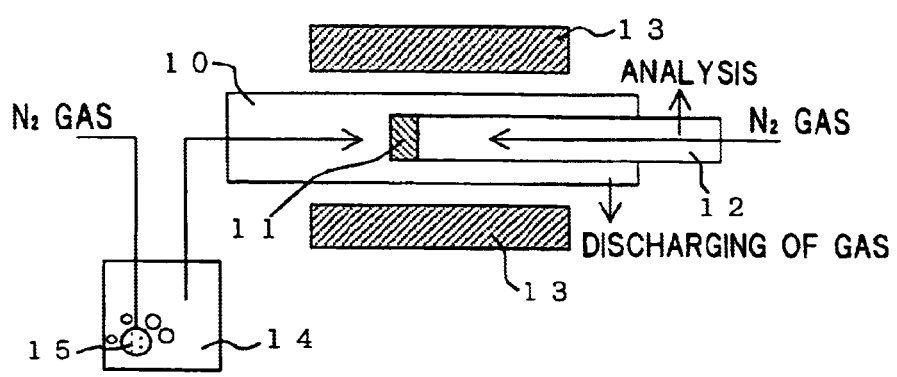
FIG. 1 is a schematic drawing showing a mode for carrying out the test for evaluation of catalyst function in xylene isomerization.

Modes for carrying out the present invention are described below. However, the present invention is not restricted to the following modes and it should be construed that design change, improvement, etc. may be made appropriately based on the ordinary knowledge of those skilled in the art as long as there is no deviation from the gist of the present invention.

The first aspect of the present invention lies in a zeolite laminated composite, characterized in that it comprises a separation membrane being constituted by a zeolite and a porous substrate being constituted by a zeolite and having a catalyst function, and the separation membrane is formed on the porous substrate. The details of the first aspect are described below.

In the zeolite laminated composite of the present invention, the porous substrate has a catalyst function by itself. That is, the present zeolite laminated composite, unlike a reaction and separation unit of a conventional type wherein a catalyst is filled in the vicinity of the porous substrate and/or the separation membrane composed of a zeolite, has no independent layer having a catalyst function, such as a catalyst layer, a catalyst-filled layer or the like. Therefore, the present zeolite laminated composite, as compared with a reaction and separation unit of a conventional type, shows a small pressure loss inside the porous substrate, and it shows such an effect that the influence derived from the polarization of the substance formed by catalytic reaction of raw material substance, etc., (i.e. the substance to be permeated through the separation membrane) is reduced; as a result, the present zeolite laminated composite exhibits a good permeation efficiency for produced substance. Incidentally, the raw material substance and the produced substance may each be a gas or a liquid.

Further in the zeolite laminated composite of the present invention, since the porous substrate has a catalyst function, no catalyst function is needed for the separation membrane itself and a separation function is sufficient for the separation membrane.

Also in the zeolite laminated composite of the present invention, there is formed, on a porous substrate composed of a zeolite, a separation membrane also composed of a zeolite; therefore, during the production or use of the composite, there can be avoided inconveniences such as crack generation in the separation membrane due to the difference in thermal expansion coefficient between the porous substrate and the separation membrane, and the separation membrane can maintain the required function.

Further in the present invention, it is preferred that the crystalline phase of the zeolite constituting the separation membrane and the crystalline phase of the zeolite constituting the porous substrate are the same. Thereby, the inconveniences such as crack generation in the separation membrane due to the difference in thermal expansion coefficient between the porous substrate and the separation membrane can be avoided more.

Incidentally, the crystalline phase of zeolite referred to in the present invention indicates a widely known crystalline phase and there can be mentioned, for example, an MFI type, a BEA type, an FER type, an MOR type, an X type, a Y type, an A type, an MTW type, a DOH type, a DDR type, an MTN type and an AFI type.

Further in the present invention, the $SiO_2/Al_2O_3$ of the zeolite constituting the porous substrate is preferably below 200, more preferably below 150, particularly preferably below 100. A $SiO_2/Al_2O_3$ of beyond 200 is not preferred because, with such a $SiO_2/Al_2O_3$, the Al ratio is too small and sufficient proton ($H^+$) for functioning as a catalyst can be not present, which makes difficult the exhibition of catalyst function.

Incidentally, the "$SiO_2/Al_2O_3$ (molar ratio)" referred to in the present invention is a value obtained by measurement by energy dispersive spectroscopy (EDS).

In the present invention, there is no restriction as to the lower limit of $SiO_2/Al_2O_3$. However, the lower limit may be roughly 40 or more when the crystalline phase of zeolite is presumed to be, for example, an MFI type, in order to avoid the generation of defects such as cracks in the separation membrane formed. Incidentally, the crystalline phase of zeolite is preferred to be one of a MFI type, an MOR type, an FER type and a BEA type. The kind of the crystalline phase of zeolite can be selected depending upon the kind of reaction and separation to be conducted. For instance, a MFI type is preferred for the later-described reaction and separation of p-xylene.

Next, description is made on the method for producing the zeolite laminated composite of the present invention.

In producing the porous substrate being constituted by a zeolite and having a catalyst function, a porous substrate is produced first by a widely known method and then a catalyst function is imparted thereto.

An example of the widely known methods for producing an MFI type porous substrate is described. Tetrapropylammonium hydroxide (TPAOH), a silica sol, $NaAlO_2$, etc. are mixed so as to give a predetermined $SiO_2/Al_2O_3$ and a predetermined $TPAOH/SiO_2$ and the resulting mixture is stirred and kneaded under a heating condition to vaporize water to obtain a dry gel. The dry gel is ground to obtain a powder and the powder is molded by an appropriate molding method to obtain a molded material. Then, the molded material is subjected to a reaction under a steam pressure, whereby a porous substrate having an $SiO_2/Al_2O_3$ of desired range can be produced. The porous substrate obtained by this method is an MFI substrate into which sodium cation ($Na^+$) has been introduced (hereinafter, this substrate is referred to also as an "Na-type MFI substrate"). Incidentally, as the above-mentioned appropriate forming method, there can be used an ordinary forming method in the ceramic field such as extrusion, CIP forming, slip casting or the like. At this stage, this porous substrate contains TPA (a structure-directing agent) in the crystals (hereinafter, the substrate is referred to also as a "TPA-Na-type MFI substrate"). This structure-directing agent (TPA) is removable by firing, whereby the substrate can be converted into a Na-type MFI substrate.

The Na-type MFI substrate wherein the structure-directing agent has been removed by firing, is subjected to an ion exchange treatment, whereby an MFI substrate wherein proton ($H^+$) has been introduced and which has a catalyst function can be obtained (hereinafter, this substrate is referred to also as an "H-type MFI substrate").

The ion exchange treatment mentioned here refers to a treatment in which an Na-type MFI substrate is immersed in, for example, an aqueous ammonium nitrate solution at a given temperature for an appropriate time. Thereby, sodium cation is replaced with ammonium cation (hereinafter, the resulting substrate is referred to also as an "$NH_4$-type MFI substrate"). This $NH_4$-type MFI substrate can be converted into an H-type MFI substrate by firing. The thus-obtained H-type MFI substrate has a catalyst function for xylene isomerization, etc., while the Na-type MFI substrate has no such catalyst function.

As the method for forming a separation membrane being constituted by a zeolite, on the porous substrate having a catalyst function, there can be employed a widely known method such as a hydrothermal synthesis method, a gas phase transport method or the like.

As the sequence for forming a separation membrane on the porous substrate, there can be mentioned, for example, (1) a sequence in which an MFI membrane is formed on an Na-type MFI substrate containing TPA (a structure-directing agent), (i.e. a TPA-Na-type MFI substrate), then firing is conducted to remove the TPA present in both the porous substrate and the separation membrane, thereafter ion exchange and firing are conducted to obtain a laminated composite consisting of an MFI membrane and an H-type MFI substrate, or (2) a sequence in which a TPA-Na-type MFI substrate is fired to obtain an Na-type MFI substrate, then ion exchange is made to obtain an $NH_4$-type MFI substrate, an MFI membrane is formed on the $NH_4$-type MFI substrate, thereafter firing is conducted to obtain a laminated composite consisting of an MFI membrane and an H-type MFI substrate.

When the separation membrane formed is a silicalite membrane containing no aluminum, either of the sequence (1) and the sequence (2) may be used. However, when the separation membrane formed contains aluminum, the sequence (2) must be used. If the sequence (1) is used, ion exchange allows not only the porous substrate but also the separation membrane to have a catalyst function; when the resulting zeolite laminated composite is assembled into a membrane reactor, a reverse reaction takes place owing to the catalyst function, at the time of permeating of an intended substance through the separation membrane; this converts the intended substance into a non-intended substance and the membrane reactor has reduced capability.

The porous substrate and the separation membrane may be different in $SiO_2/Al_2O_3$ as long as their crystalline phases are the same. They may contain different kinds of cations. Further, the porous substrate may have loaded thereon a catalyst such as Pt, Pd, Cu or the like so as to have a catalyst function. As the shape of the zeolite laminated composite, there can be mentioned, for example, a bar shape, a pellet shape, a flat plate shape, a tube shape, a monolithic shape or a honeycomb shape.

Next, description is made on the second aspect of the present invention. The second aspect of the present invention lies in a zeolite membrane reactor, characterized in that the interior of a reactor vessel is separated by any of the above-mentioned zeolite laminated composites, into a raw material substance side contacting with a porous substrate having a catalyst function, of the composite and a produced substance side contacting with a separation membrane of the composite and that a produced substance formed by the catalytic reaction of a raw material substance is permeated through the separation membrane from the raw material substance side to the produced substance side and is separated.

The raw material substance fed into the raw material substance side of the zeolite membrane reactor of the present invention first contacts with the porous substance constituting the zeolite laminated composite and infiltrates into the inside thereof. Here, since the zeolite membrane reactor of the present invention is provided with any of the above-mentioned zeolite laminated composites, a catalytic reaction takes place on the porous substance having a catalyst function. Next, the substance produced permeates through the separation membrane to the produced substance side and is separated, whereby an intended product (a produced substance) can be obtained.

The zeolite membrane reactor of the present invention is provided with any of the above-mentioned zeolite laminated composites as a reaction and separation unit; therefore, the reactor, as compared with when using a reaction and separation unit containing an independent layer having a catalyst function, such as catalyst layer, catalyst-filled layer or the like, shows a small pressure loss and has high separation characteristic and high permeability. Further, having no catalyst-filled layer, the present membrane reactor can be small in size.

Further, in the present zeolite membrane reactor, the separation membrane constituting the reaction and separation unit hardly causes inconveniences such as cracks due to the difference in thermal expansion behavior between the porous substrate and the separation membrane. Consequently, with the zeolite membrane reactor of the present invention, the function of the reaction and separation unit is maintained stably, and long-term use and operation is possible.

EXAMPLES

The present invention is specifically described below by way of Example. However, the present invention is in no way restricted to the Example.

(Production of Porous Substrates)

To 16.27 g of a 10% aqueous TPAOH solution (a product of Wako Pure Chemical Industries, Ltd.) were added 0.656 g of $NaAlO_2$ (a product of Wako Pure Chemical Industries, Ltd.) and 40.05 g of a silica sol (about 30 wt %, Snowtex S, a product of Nissan Chemical Industries, Ltd.). The mixture was stirred at room temperature for 1 hour using a desk shaker and then stirred and kneaded with heating at about 80° C. using a hot stirrer, to vaporize water, whereby a colorless dry gel was obtained.

The dry gel was ground to obtain a powder, after which the powder was subjected to uniaxial pressing with a die at a total pressure of 2 tons to obtain a cylindrical molded material having a diameter of 19 mm and a thickness of 2 mm. The molded material was set on a fluororesin plate in a stainless steel-made pressure vessel with a fluororesin-made inner cylindrical container provided with distilled water of the same weight as the molded material, in a state that there was no contact between the molded material and the water. The pressure vessel was placed in an oven at 180° C. to make the contents react under a self steam pressure for 12 hours, whereby a porous substrate was obtained. The crystal phase of the porous substrate obtained was examined by X-ray diffractiometry. As a result, the porous substrate was found to be an MFI type zeolite of perfect crystal (a TPA-Na-type MFI substrate).

Incidentally, as to the crystal phase of zeolite, a case when, in X-ray diffractiometry, there was only a broad halo and no clear peak was found, in a region of 20 to 3° (CuKα), was expressed as "amorphous"; a case when a zeolite peak was seen even slightly, was expressed as "under crystallization"; and a case when all the sharp peaks of zeolite were seen clearly and there was no halo, was expressed as "perfect crystal".

The TPA-Na-type MFI substrate was fired at 600° C. for 3 hours to obtain an Na-type MFI substrate (a porous substrate constituting Comparative Example 1). The Na-type MFI substrate was immersed for 1 hour in an aqueous solution containing 1 mol/l of ammonium nitrate, heated to 80t° C. The resulting material was washed with water and dried and then fired at 873K for 3 hours to obtain an H-type MFI substrate (a porous substrate constituting Example 1). Each porous substrate obtained was measured for crystalline phase by X-ray diffractiometry, which indicated that each porous substrate was an MFI type zeolite of perfect crystal. (Evaluation of catalyst function of each porous substrate)

The catalyst function of each porous substrate for xylene isomerization was evaluated by the Wicke-Kallenbach method. FIG. 1 is a schematic view showing a mode for carrying out the test for evaluation of catalyst function for xylene isomerization and indicates a state in which there is placed, inside a test apparatus 10, a sample-holding section 12 to which a sample 11 (a porous substrate) is fitted. Incidentally, the test apparatus 10 is heatable by an electric oven 13.

A carrier gas (an $N_2$ gas) is introduced at 50 cc/min into m-xylene through a bubbler 15 to generate about 1 vol % of m-xylene gas. This m-xylene gas was fed to one side of the sample 11 (a porous substrate) under a heating (200° C.) condition, and the permeated gas at the opposite side thereof was swept by an $N_2$ gas of 50 cc/min. The gas compositions at both sides were analyzed by gas chromatography. The results are shown in Table 1.

TABLE 1

|  | p-Xylene (ppm) | m-Xylene (ppm) | o-Xylene (ppm) | Proportion of p-xylene in raw material gas or permeated gas |
|---|---|---|---|---|
| Raw material gas Produced gas (gas after permeation | 36 | 10213 | 48 | <1% |
| H-type MFI substrate (porous substrate of Exam. 1) | 49.5 | 535 | 2.9 | 8.10% |
| Na-type MFI substrate (porous substrate of Com. Exam. 1) | 0.0974 | 495.9 | 1.17 | <1% |

(Formation of Separation Membranes (Production of Reaction and Separation Units))

There were mixed 15.26 g of a 10% aqueous TPAOH solution (a product of Wako Pure Chemical Industries, Ltd.) and 1.995 g of tetrapropylammonium bromide (a product of Wako Pure Chemical Industries, Ltd.). Thereto were added 49.85 g of distilled water and a 30 wt % silica sol (Snowtex S, a product of Nissan Chemical Industries, Ltd.). The mixture was stirred at room temperature for 60 minutes using a desk shaker to produce a sol for membrane formation. The sol for membrane formation was placed in a 100-ml stainless steel-made pressure vessel with a fluororesin-made inner cylindrical container. Therein was immersed two kinds of porous substrates, i.e. the TPA-Na-type MFI substrate produced above and an alumina substrate. The pressure vessel was placed in an oven to make the contents react at 180° C. for 6 hours, whereby two kinds of membrane-formed substrates were obtained.

Each membrane-formed substrate was heated to 550° C. in an electric oven and kept at that temperature for 4 hours to remove TPA, whereby laminated composites (of Comparative Examples 1 and 2) in which a silicalite membrane (a separation membrane) of about 20 μm was formed on each porous substrate were obtained.

The composite of Comparative Example 1 was immersed in an aqueous solution containing 1 mol/l of ammonium nitrate, heated to 80° C., for 1 hour; the resulting composite was washed with water, dried, then heated to 550° C. in an electric oven and kept for 4 hours to obtain a reaction and separation unit (of Example 1) in which a silicalite membrane (a separation membrane) of about 20 μm was formed on a porous substrate.

(Evaluation of Reaction and Separation Units)

The function of each reaction and separation unit for xylene isomerization was evaluated at 200° C. by the Wicke-Kallenbach method. Specifically, the evaluation was made in the same manner as in the above-described evaluation of the catalyst function of porous substrate and was carried out using a test apparatus 10 shown in FIG. 1. Incidentally, each reaction and separation unit was fitted to a sample-holding section 12 so that the porous substrate of each unit was at the gas (m-xylene gas)-feeding side. The results are shown in Table 2.

TABLE 2

|  | p-Xylene (ppm) | m-Xylene (ppm) | o-Xylene (ppm) | Proportion of p-xylene in raw material gas or gas after permeation |
|---|---|---|---|---|
| Raw material gas Produced gas (gas after permeation) | 36 | 10213 | 48 | <1 |
| Exam. 1 | 41.3 | 2.71 | 0.278 | 93.3 |
| Comp. Exam. 1 | 0.44 | 2.2 | 0 | 16.7 |
| Comp. Exam. 2 | 1.2 | 193 | 1.3 | <1 |

(Discussion)

The results of the evaluation of catalyst function of each porous substrate are explained. Each porous substrate is an agglomerate of MFI type zeolite particles of about 10 μm and has no separation function. Therefore, if there is a difference in the composition of raw material gas and the composition of gas after permeation, it means that the porous substrate used has a catalyst function for isomerization.

As shown in Table 1, in the porous substrate of Example 1, the proportion of p-xylene in the gas after permeation increased to about 8%. This is considered to be because m-xylene was converted into p-xylene by the catalytic action (for xylene isomerization) of the porous substrate of Example 1. Meanwhile, with the porous substrate of Comparative Example 1, the proportion of p-xylene in the gas after permeation was the same (less than 1%) as that in the raw material gas and there was no difference in composition between the raw material gas and the gas after permeation. Thus, it was found that the porous substrate of Example 1 has a catalyst function but the porous substrate of Comparative Example 1 has no catalyst function for xylene isomerization.

Next, explanation is made on the results of evaluation of reaction and separation units.

Example 1 is constituted by a silicalite membrane and an H-type MFI substrate. Comparative Example 1 is constituted by a silicalite membrane and an Na-type MFI substrate, and Comparative Example 2 is constituted by a silicalite membrane and an alumina substrate.

It is known that the silicalite membrane allows p-xylene present in xylene isomers to permeate therethrough selectively and separates p-xylene. However, the silicalite membrane has no proton which becomes an active site of catalyst for xylene isomerization. That is, the function of the silicalite membrane is only to allow p-xylene to permeate therethrough selectively.

As shown in Table 2, in Example 1 and Comparative Example 1, p-xylene, as compared with m-xylene and o-xylene, was permeated selectively, and the proportion of p-xylene in the gas after permeation was higher than that in the raw material gas and was about 93% (Example 1) and about 17% (Comparative Example 1). The concentration of p-xylene in the gas after permeation, in Example 1 was about 94 times that in Comparative Example 1.

The reason for this result is interpreted as follows. That is, in the zeolite laminated composite (reaction and separation unit) of Example 1 according to the present invention, m-xylene in raw material gas is isomerized to p-xylene xylene in the porous substrate having a catalyst function and, in the silicalite membrane, permeation and separation is made; while in the zeolite laminated composite of Comparative Example 1, only permeation and separation of p-xylene in raw material gas takes place. As is clear in the above-made evaluation of catalyst function of each porous substrate, the porous substrate of Example 1, i.e. the H-type MFI substrate has a catalyst function for xylene isomerization, while the porous substrate of Comparative example 1, i.e. the Na-type MFI substrate has no activity for xylene isomerization. In the zeolite laminated composite of Example 1, isomerization to p-xylene takes place, accordingly the p-xylene concentration in raw material gas increases in the porous substrate, this p-xylene permeates the separation membrane, and it is considered that thereby the p-xylene concentration in the gas after permeation was increased.

In the laminated composite of Comparative Example 2, the p-xylene in the raw material gas is not separated and the proportion of p-xylene in the gas after permeation remained at less than 1%. This is considered to be because the alumina substrate has no catalyst function and moreover cracks generated in the MFI membrane, which gave a low p-xylene concentration.

From the above results, it could be confirmed that the zeolite laminated composite of the present invention has excellent separation characteristics and excellent permeability.

INDUSTRIAL APPLICABILITY

A described above, the zeolite laminated composite of the present invention shows a small pressure loss because a particular separation membrane is formed on a particular porous substrate having a catalyst function, and hardly generates defects such as cracks in the separation membrane even under a high temperature condition because both the separation membrane and the porous substrate are constituted by a zeolite.

The zeolite membrane reactor of the present invention has high separation characteristics and high permeability because it is constituted by the above-mentioned zeolite laminated composite.

What is claimed is:

1. A zeolite laminated composite, comprising a separation membrane being constituted by a zeolite, and a porous substrate being constituted by a zeolite and having a catalyst function, the zeolite constituting the porous substrate having a $SiO_2/Al_2O_3$ molar ratio of 40 or more but below 200, a crystalline phase of the zeolite constituting the separation membrane and a crystalline phase of the zeolite constituting the porous substrate being the same, and the separation membrane being formed on the porous substrate.

2. A zeolite laminated composite according to claim 1, wherein a crystalline phase of each zeolite is an MFI type.

3. A zeolite membrane reactor, comprising reactor vessel and a zeolite laminated composite comprising a separation membrane being constituted by a zeolite, and a porous substrate being constituted by a zeolite and having a catalyst function; said zeolite constituting the porous substrate having a $SiO_2/Al_2O_3$ molar ratio of 40 or more but below 200 and a crystalline phase of the zeolite constituting the separation membrane and a crystalline phase of the zeolite constituting the porous substrate being the same, and said separation membrane being formed on the porous substrate, said reactor vessel being separated by said zeolite laminated composite into a raw material substance side contacting with said porous substrate and a produced substance side contacting with said seperation membrane, whereby a produced substance formed by catalytic reaction of a raw material substance is permeated through the separation membrane from the raw material substance side to the produced substance side to be separated.

4. A zeolite membrane reactor according to claim 3, wherein a crystalline phase of each zeolite is an MFI type.

* * * * *